US009134492B2

(12) United States Patent
Hsieh

(10) Patent No.: US 9,134,492 B2
(45) Date of Patent: Sep. 15, 2015

(54) CABLE CLIP AND CABLE MANAGEMENT STRUCTURES FOR USE WITH AN OPTOELECTRONIC MODULE

(71) Applicant: FINISAR CORPORATION, Sunnyvale, CA (US)

(72) Inventor: Cindy H. Hsieh, Los Altos, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/264,815

(22) Filed: Apr. 29, 2014

(65) Prior Publication Data

US 2014/0321821 A1  Oct. 30, 2014

Related U.S. Application Data

(60) Provisional application No. 61/817,230, filed on Apr. 29, 2013, provisional application No. 61/902,067, filed on Nov. 8, 2013.

(51) Int. Cl.
*G02B 6/36* (2006.01)
*G02B 6/42* (2006.01)
*G02B 6/38* (2006.01)

(52) U.S. Cl.
CPC ............ *G02B 6/4292* (2013.01); *G02B 6/3893* (2013.01); *G02B 6/3897* (2013.01); *G02B 6/4249* (2013.01); *G02B 6/4269* (2013.01)

(58) Field of Classification Search
CPC .. G02B 6/3893; G02B 6/3897; G02B 6/4249; G02B 6/4269; G02B 6/4292
USPC ............................................. 385/93; 174/255
See application file for complete search history.

(56) References Cited

U.S. PATENT DOCUMENTS 6,533,603 B1 * 3/2003 Togami .......................... 439/372
6,935,882 B2 * 8/2005 Hanley et al. .................. 439/372

(Continued)

FOREIGN PATENT DOCUMENTS

DE    102011005792 A1 *  9/2011
EP        1602955 A2     12/2005

(Continued)

OTHER PUBLICATIONS

Invitation to Pay Additional Fees and Protest Fee Mailed Aug. 27, 2014 in related PCT Application No. PCT/US2014/035953.

(Continued)

*Primary Examiner* — Peter Radkowski
(74) *Attorney, Agent, or Firm* — Maschoff Brennan

(57) ABSTRACT

An example embodiment includes a cable clip. The cable clip is configured to maintain engagement of an optical interface with a lens assembly included in an optoelectronic module. The cable clip includes a forward section, a clip body, a connector retention mechanism, a lens latch, and a release lever. The clip body is connected to the forward section at a clip shoulder. The connector retention mechanism is configured to retain the optical interface and extends from the clip body. The lens latch is positioned at a first end. The lens latch is configured to latch the lens assembly when a portion of the optical interface is received within the lens assembly. The release lever is connected to the forward section. The release lever is configured to unlatch the lens latch from the lens assembly in response to application of an actuation force above a particular threshold magnitude.

19 Claims, 15 Drawing Sheets

(56) References Cited

U.S. PATENT DOCUMENTS

| | | | |
|---|---|---|---|
| 7,066,746 B1 * | 6/2006 | Togami et al. | 439/157 |
| 7,314,384 B2 * | 1/2008 | Togami et al. | 439/484 |
| 8,218,335 B2 * | 7/2012 | Moore et al. | 361/801 |
| 2003/0053768 A1 * | 3/2003 | Brezina et al. | 385/92 |
| 2003/0095758 A1 * | 5/2003 | Morse et al. | 385/89 |
| 2003/0236019 A1 * | 12/2003 | Hanley et al. | 439/372 |
| 2004/0121646 A1 * | 6/2004 | Iamartino et al. | 439/445 |
| 2006/0056779 A1 * | 3/2006 | Wang | 385/92 |
| 2007/0059953 A1 * | 3/2007 | Togami et al. | 439/76.1 |
| 2009/0032291 A1 * | 2/2009 | Moore et al. | 174/255 |
| 2013/0071064 A1 * | 3/2013 | Rosenberg et al. | 385/49 |

FOREIGN PATENT DOCUMENTS

| | | | | |
|---|---|---|---|---|
| JP | 2004038095 A | * | 2/2004 | G02B 6/42 |
| JP | 2011247952 A | * | 12/2011 | |

OTHER PUBLICATIONS

International Search Report and Written Opinion mailed Apr. 9, 2015 in related PCT Application No. PCT/US2014/035953 (16 pages).

* cited by examiner

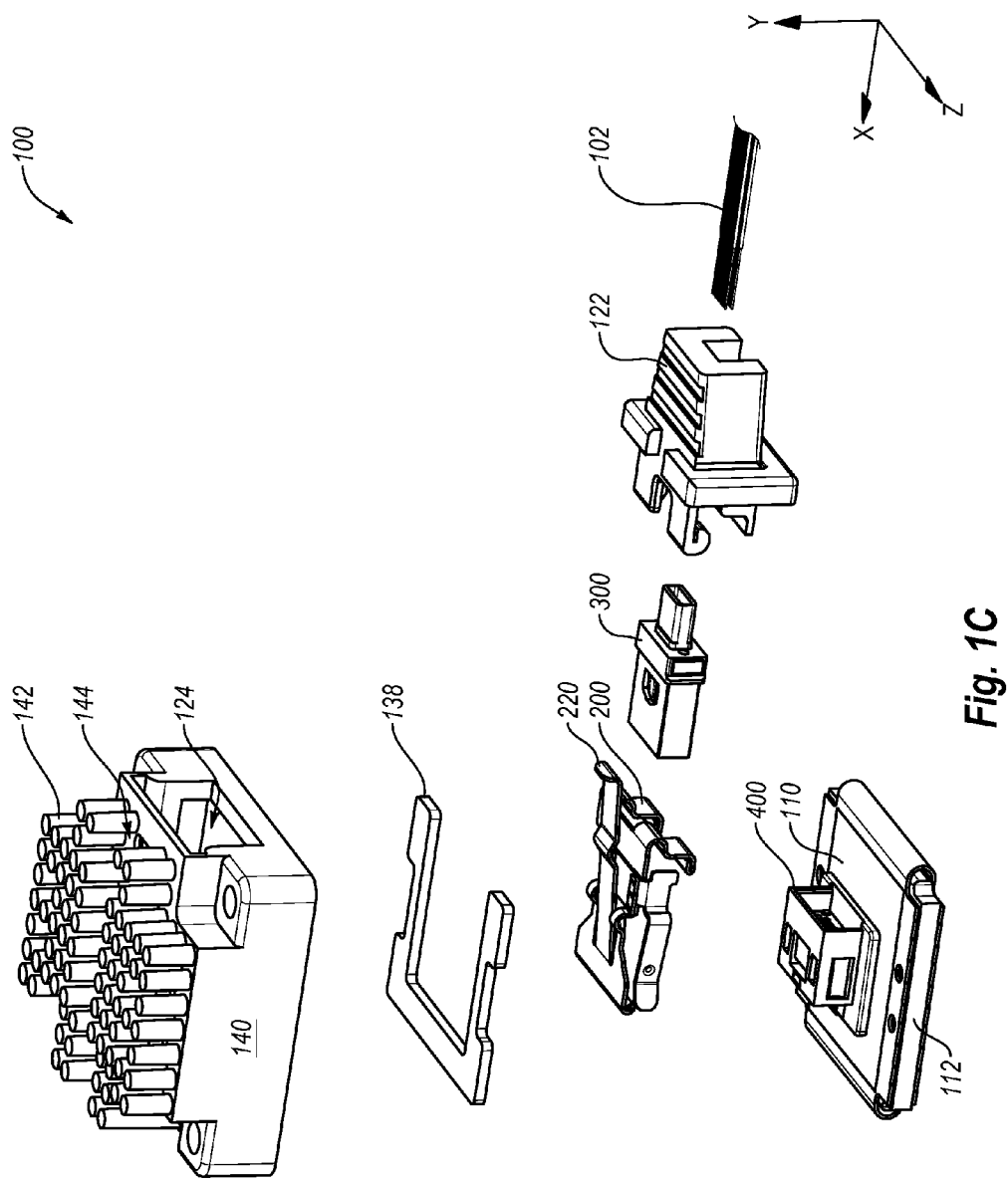

CABLE CLIP AND CABLE MANAGEMENT STRUCTURES FOR USE WITH AN OPTOELECTRONIC MODULE

CROSS-REFERENCE TO RELATED APPLICATIONS

This patent application claims the benefit of and priority to U.S. Provisional Patent Application Nos. 61/817,230 filed Apr. 29, 2013 and 61/902,067 filed Nov. 8, 2013, which are incorporated herein by reference in their entireties.

FIELD

Embodiments disclosed herein relate to optical components. In particular, some embodiments described herein relate to cable clips and cable management structures that may be used with optoelectronic modules.

BACKGROUND

Some data transmission involves the conversion of optical signals to electrical signals and/or electrical signals to optical signals. In some applications, the conversion occurs at a circuit board. For example, an optical cable carrying one or more optical signals may interface with an optoelectronic module such as a board-mounted optical engine. At the optical engine, the optical signals may be transduced from optical signals to electrical signals using optical receivers. The electrical signals may then be communicated along etched copper traces integrated into the circuit board to a destination. Likewise, electrical signals may be communicated along copper traces to the board-mounted optical engine. At the board-mounted optical engine, the electrical signals may be transduced to optical signals by optical transmitters. The optical signals may then be further communicated along the same or a different optical cable that interfaces with the optoelectronic module.

In some board-mounted optical engines, a lens assembly may be configured to receive an optical interface such as a pluggable cable connector. The optical interface generally supports one or more optical cables that communicate the optical data to and from the board-mounted optical engine. When received in the lens assembly, alignment of the optical interface with respect to the lens assembly and retention of the optical interface within the lens assembly may help ensure proper communication of the optical data. However, due to mechanical loads applied to the optical cables and/or the pluggable cable connector, the optical interface may be inadvertently disengaged from the lens assembly or misalignment may occur between the optical interface and the lens assembly.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

An example embodiment includes a cable clip. The cable clip is configured to maintain engagement of an optical interface with a lens assembly included in an optoelectronic module. The cable clip includes a forward section, a clip body, a connector retention mechanism, a lens latch, and a release lever. The clip body is connected to the forward section at a clip shoulder. The connector retention mechanism is configured to retain the optical interface and extends from the clip body. The lens latch is positioned at a first end. The lens latch is configured to latch the lens assembly when a portion of the optical interface is received within the lens assembly. The release lever is connected to the forward section. The release lever is configured to unlatch the lens latch from the lens assembly in response to application of an actuation force above a particular threshold magnitude.

Another example embodiment includes connector assembly. The connector assembly is configured to be at least partially positioned within a module housing of an optoelectronic module. The connector assembly includes a cable clip and a dust seal. The cable clip is configured to maintain engagement between an optical interface and a lens assembly when the cable clip is latched and to allow disengagement of the connector from the lens assembly when the cable clip is unlatched. The cable clip includes a release lever that is sized in relation to the module housing such that when the connector is received in the lens assembly, a portion of the release lever protrudes from the module housing. The release lever is configured to unlatch the cable clip in response to application of an actuation force to the portion of the release lever that protrudes from the module housing. The dust seal is configured to at least partially surround the connector and the cable clip. The dust seal is sized to substantially fill a space between the connector and a module opening through which the connector assembly is introduced into the module housing.

Another example embodiment includes a cable clip. The cable clip is configured to maintain engagement between a mechanical transfer (MT) connector having twenty-four optical channels configured to communicate twenty-four channels of data and a lens assembly included in an optoelectronic module configured to communicate data at 25 gigabits per second (G) or higher. The cable clip includes a clip body, a connector retention mechanism, a forward section, a lens latch, and a release lever. The connector retention mechanism is configured to retain the MT connector and extends from the clip body. The forward section is attached to the clip body by clip shoulders. The lens latch is positioned at a first end of the forward section. The lens latch is configured to apply a latching force to a front surface of the lens assembly when the MT connector is received within the lens assembly. The release lever extends from the front portion and is sized to partially protrude from a module housing. The release lever is configured to rotate the forward section in response to the application of an actuation force to the release lever.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 1A-1D illustrate an example optoelectronic module.

DESCRIPTION OF SOME EXAMPLE EMBODIMENTS

Embodiments disclosed herein relate to optical components. More particularly, some example embodiments relate to cable clips that may be used in optoelectronic modules and some additional structural features that may be included in the optoelectronic modules.

An example embodiment includes a cable clip (clip) that is configured to maintain engagement of a connector with a lens assembly of an optical engine. The clip may also enable the connector to be disengaged from the lens assembly without disassembling the optical engine. The clip includes a forward section, a connector retention mechanism, a lens latch, and a release lever. The connector retention mechanism is configured to retain the connector in a position that enables the connector to be received by the lens assembly. The lens latch is positioned at a first end of the forward section. The lens latch latches the connector to the lens assembly when the connector is received within the lens assembly. The release lever is connected to the forward section and a portion of the release lever protrudes from a module housing of the optical engine. The release lever is configured to unlatch the lens latch from the lens assembly in response to application of an actuation force above a particular threshold magnitude to the portion of the release lever that protrudes from the module housing. The application of the actuation force results in a rotation and displacement of the forward section that unlatches the lens latch.

Reference will now be made to the drawings to describe various aspects of some embodiments. It is to be understood that the drawings are diagrammatic and schematic representations of the embodiments, and are not meant to be limiting, nor are they necessarily drawn to scale. Throughout the drawings, like numbers generally reference like structures unless described otherwise.

Figure 1A:
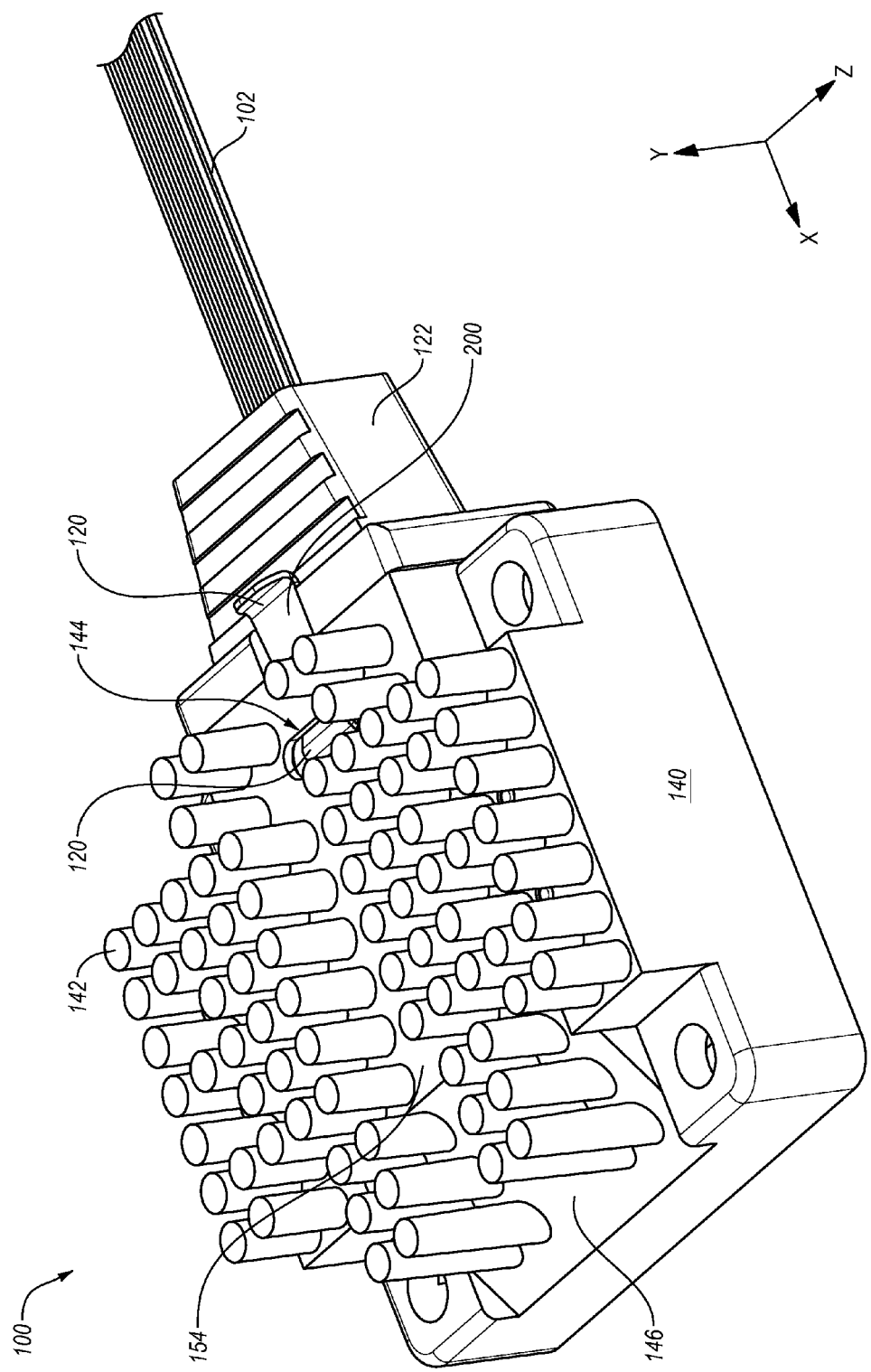
Figure 1B:
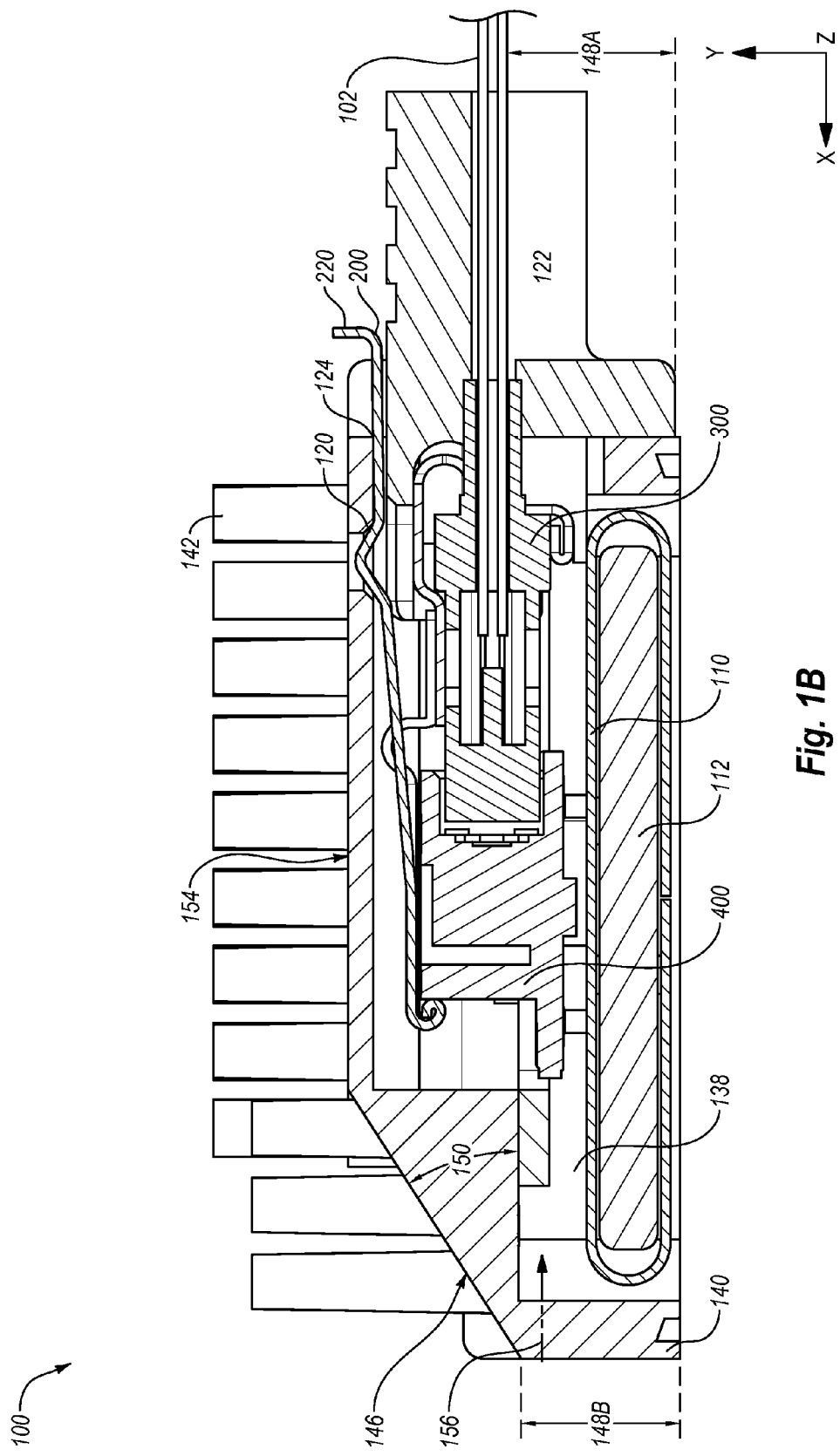
Figure 1D:
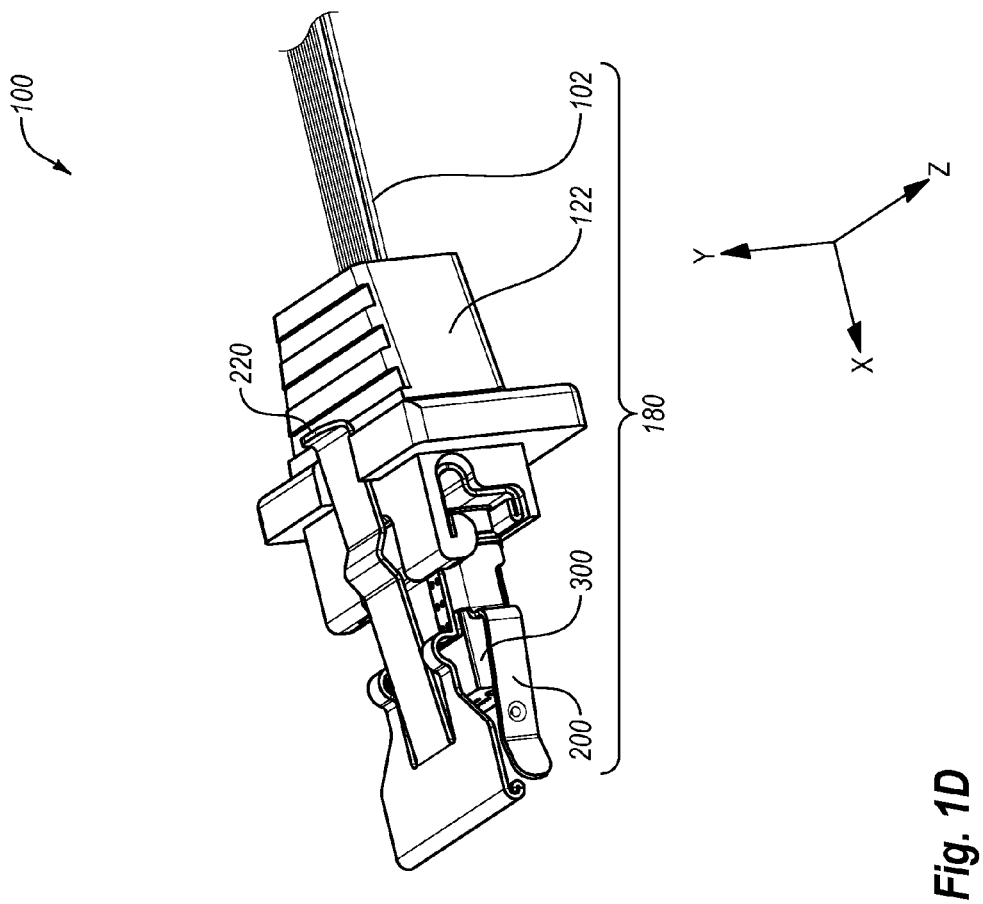
Figure 1D:
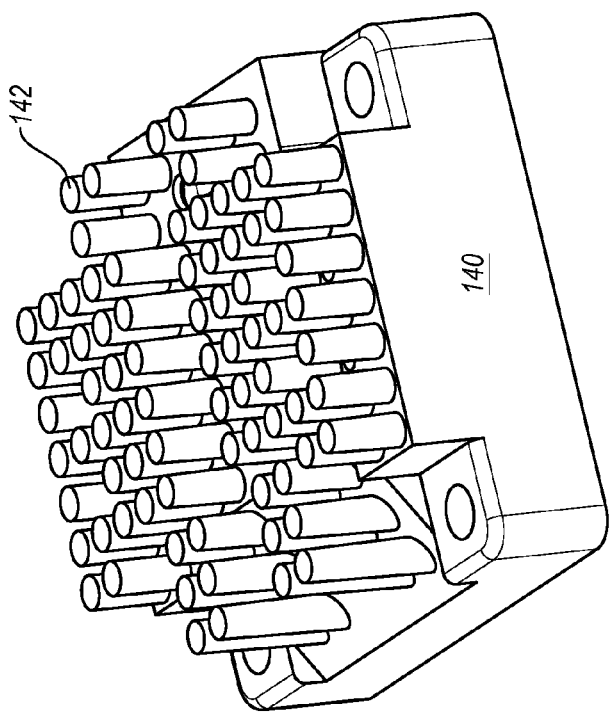

FIGS. 1A-1D illustrate an example optoelectronic module 100. Specifically, FIG. 1A depicts an external view of the optoelectronic module 100. FIG. 1B depicts a sectional view of the optoelectronic module 100. FIG. 1C depicts a partially exploded view of the optoelectronic module 100. FIG. 1D depicts another partially exploded view of the optoelectronic module 100. The optoelectronic module 100 depicted in FIGS. 1A-1D includes an optical engine. An example of the optoelectronic module 100 may be designed for high-speed (e.g., 25 gigabits per second (G) or higher) optical interconnects between integrated circuits and/or between circuit boards. Additionally or alternatively, the optoelectronic module 100 may be configured to receive twenty-four optical channels, each of which may be configured to communicate data.

The optoelectronic module 100 may be mounted to a circuit board (not shown) of a host device and may be configured to communicate data between the host device and a network (not shown), for example. The optoelectronic module 100 may convert electrical signals to optical signals representing the electrical signals and vice versa. For example, data in the form of optical signals may be communicated from a network along optical cables 102 to the optoelectronic module 100. Components (examples of which are described below) of the optoelectronic module 100 may convert the optical signals to electrical signals representative of the optical signals. The electrical signals may then be communicated to the host device. Likewise, the host device may communicate electrical signals to the optoelectronic module 100. The optoelectronic module 100 may convert the electrical signals to optical signals representative of the electrical signals. The optical signals may be communicated along the optical cables 102 into the network to, e.g., another optoelectronic module.

The optoelectronic module 100 may include a module housing 140. The module housing 140 may generally protect components positioned within the module housing 140. Additionally, the module housing 140 may dissipate heat. In the depicted optoelectronic module 100, for example, the module housing 140 may include one or more heat dissipating structures 142 configured to dissipate heat from the optoelectronic module 100. Only one of the heat dissipating structures 142 is labeled in FIGS. 1A-1D. In some embodiments, one or more heat dissipating structures may be removably attached to the module housing 140. Additionally or alternatively, the heat dissipating structures 142 may be omitted.

The module housing 140 may also include a cable path 144 (FIGS. 1A and 1C only) defined between one or more of the heat dissipating structures 142. One or more optical cables (e.g., 102) of other optoelectronic modules positioned adjacent to the optoelectronic module 100 may be positioned in the cable path 144. Positioning the optical cables in the cable path 144 may help to prevent or reduce the likelihood that the optical cables become tangled or damaged. In some embodiments, up to six or more optical cables, each from other optoelectronic modules, may be positioned in the cable path 144. Some additional details of an implementation including multiple optoelectronic modules are discussed with reference to FIGS. 6A and 6B.

In some embodiments, the cable path 144 may include a sloped section 146 (FIGS. 1A and 1B only). As best illustrated in FIG. 1B, the optical cable 102 may exit the optoelectronic module 100 at an exit height 148A. The exit height 148A may generally correspond to an entry height 148B at which an optical cable of one or more other optoelectronic modules may enter the cable path 144. The sloped section 146 may then gradually increase in height until the sloped section 146 intercepts a top 154 (FIGS. 1A and 1B only) of the module housing 140.

A sloped section angle (angle) 150 (FIG. 1B only) may be defined between an outer surface of the sloped section 146 and a horizontal reference plane 156 (FIG. 1B only). The angle 150 and/or a separation between the optoelectronic module 100 and an adjacent optoelectronic module may be configured to prevent an excess bending applied to one or more optical cables. For example, the angle 150 and/or the separation may ensure that a maximum acceptable bend radius of the one or more optical cables that exit the adjacent optoelectronic module and that enter the cable path 144 at the sloped section 146 is not exceeded.

In particular, as shown in FIG. 1B, the optical cable 102 may exit the optoelectronic module 100 at a relatively horizontal or 0-degree angle. The optical cable 102 may be redirected upward (e.g., an arbitrarily defined positive y-direction included in an arbitrarily defined X-Y-Z Cartesian coordinate system) by a sloped section (e.g., the sloped section 146) of an adjacent optical module, which may be substantially similar to the optoelectronic module 100. The angle 150 of the adjacent optical module may accordingly support the optical cable 102 such that the optical cable 102 may not exceed an acceptable bend radius. Reducing the likelihood that the bend radius is exceeded may reduce a likelihood that the optical cable 102 is damaged. The angle 150 may be based on the type of optical fiber included in the optical cable 102 and/or a number of optical cables (e.g., 102) or optical fibers that may be positioned in the cable path 144.

With reference to FIGS. 1B and 1C, a lens assembly 400, a printed circuit board (PCB) 110, a heat sink 138, and a module board 112 may be positioned within the module housing 140. The lens assembly 400 may be positioned above one or more components (not shown) mounted to the PCB 110. The heat sink 138 may be configured to transfer heat from the one or more components mounted to the PCB 110 to the module housing 140.

The lens assembly 400 may be configured to receive a connector 300. The optical cables 102 may be optically coupled to the connector 300 such that optical signals may be communicated between the optical cables 102 and the connector 300. The connector 300 may be optically coupled with the optical cables 102 and may be an interface at which optical signals may be further communicated. For example, the optical signals may be communicated from the optical cables 102 to the connector 300 and then to the lens assembly 400. When received in the lens assembly 400, the optical signals may be communicated by the lens assembly 400 to the one or more components mounted to the PCB 110. As used herein, the term "optical interface" may be used to describe the connector 300 and similar and/or analogous structures that provide an interface with optical signals carried over the optical cables 102. In the depicted optoelectronic module 100, the optical cables 102 may include ribbon optical fibers, for example. Additionally or alternatively, the connector 300 may include a pluggable mechanical transfer (MT) connector.

With reference to FIGS. 1B-1D, engagement and alignment between the connector 300 and the lens assembly 400 may be maintained by a cable clip (clip) 200. Specifically, the clip 200 may retain the connector 300. When the connector 300 is received in the lens assembly 400, the clip 200 may latch to the lens assembly 400 and/or the module housing 140 as described in more detail herein.

As best illustrated in FIG. 1D, the clip 200 may be included with a dust seal 122 and the connector 300 to form a connector assembly 180 (FIG. 1D only). The dust seal 122 may be configured to partially surround the connector 300 and the clip 200. The dust seal 122 may reduce introduction of dust or similar unwanted materials into the module housing 140 when the connector 300 is received in the lens assembly 400. Specifically, the dust seal 122 may be shaped to correspond to a module opening 124 (FIGS. 1B and 1C only) and to partially surround a portion of the connector 300. When the connector 300 is received by the lens assembly 400 and/or generally positioned in the module opening 124, the dust seal 122 may substantially fill a space between the connector 300 and the module opening 124, thereby preventing or substantially preventing the ingress of dust and/or other particles.

Referring to FIGS. 1A-1D, the connector assembly 180 may be introduced into the module housing 140 through the module opening 124. FIG. 1D depicts the connector assembly 180 external to the module housing 140. FIGS. 1A and 1B depict the connector assembly 180 positioned within the module housing 140.

The lens assembly 400 may be positioned within the module housing 140. In some embodiments, the lens assembly 400 may be mounted to the module board 112. The connector assembly 180 may be introduced through the module opening 124 such that the lens assembly 400 receives the connector 300.

As best shown in FIGS. 1B and 1C, when the connector 300 is received in the lens assembly 400, a release lever 220, or some portion thereof, may extend past (e.g., farther in an arbitrarily defined negative x-direction) the module housing 140. By protruding from the module housing 140, the release lever 220 may enable application of an actuation force 236 (FIG. 1B only) to the release lever 220 without removal or disassembly of the module housing 140. The actuation force 236 may enable disengagement of the connector 300 from the lens assembly 400 and may enable disengagement of the clip 200 from the module housing 140. When the connector 300 is disengaged from the lens assembly 400 and the clip 200 is disengaged from the module housing 140, the connector assembly 180 may be removed from the module housing 140. Thus, the clip 200 secures the connector 300 to the lens assembly 400, maintains engagement between the connector 300 and the lens assembly 400, and enables disengagement of the clip 200 from the module housing 140 and the connector 300 from the lens assembly 400 without removal or disassembly of the optoelectronic module 100.

Figure 2A:
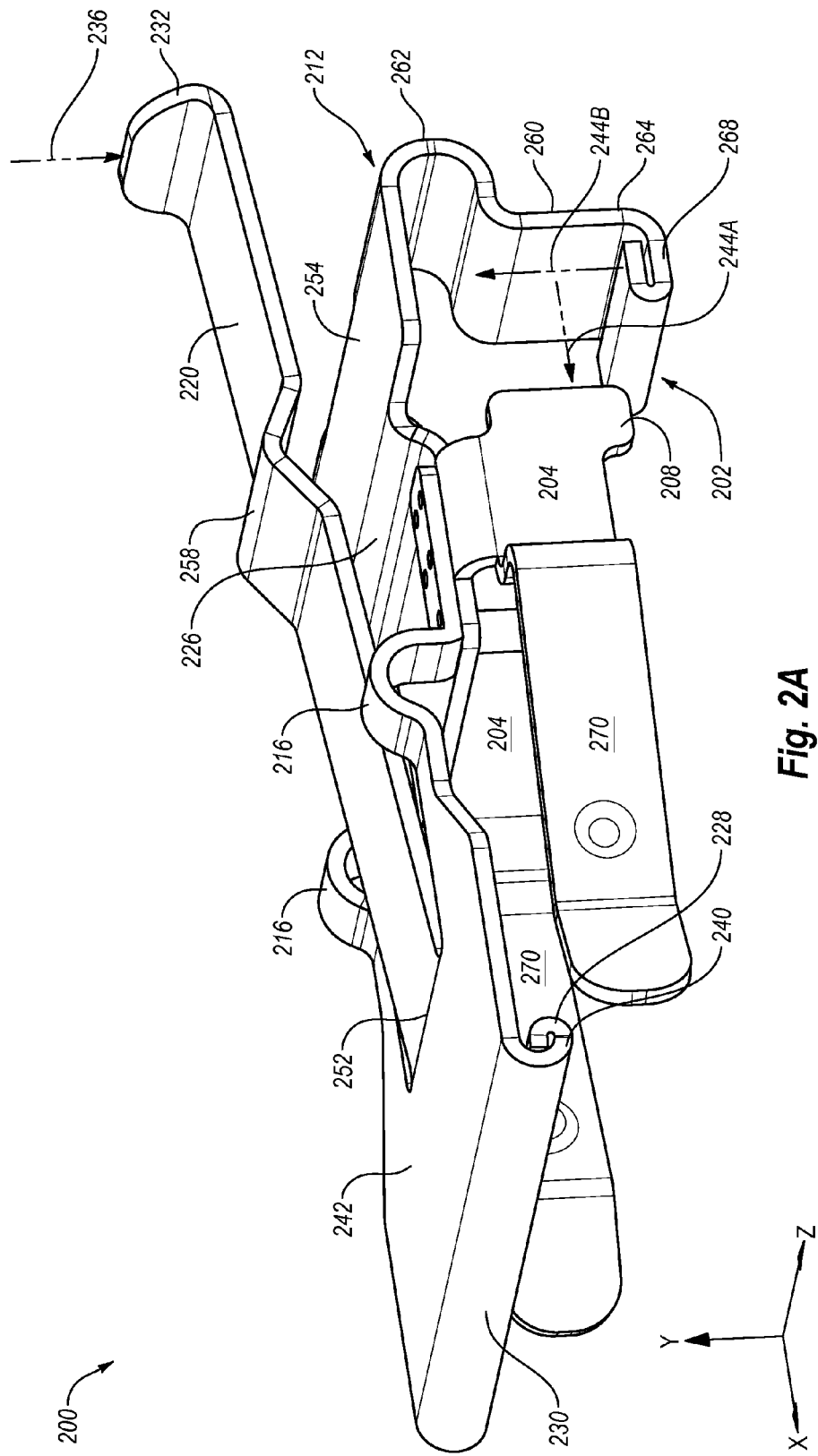
FIGS. 2A-2C illustrate an example cable clip (clip) that may be implemented in the optoelectronic module of FIGS. 1A-1D.
Figure 2B:
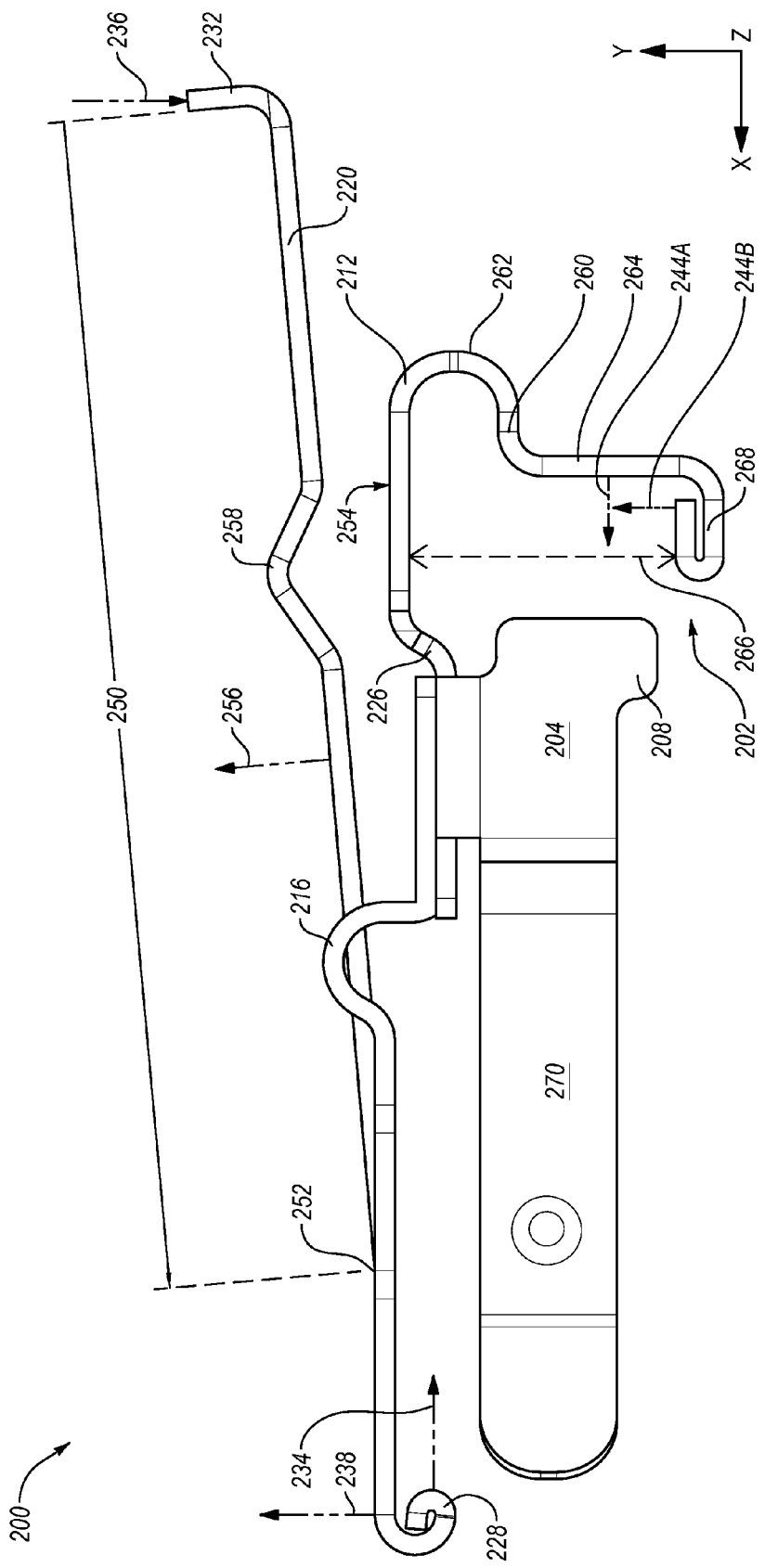
Figure 2C:
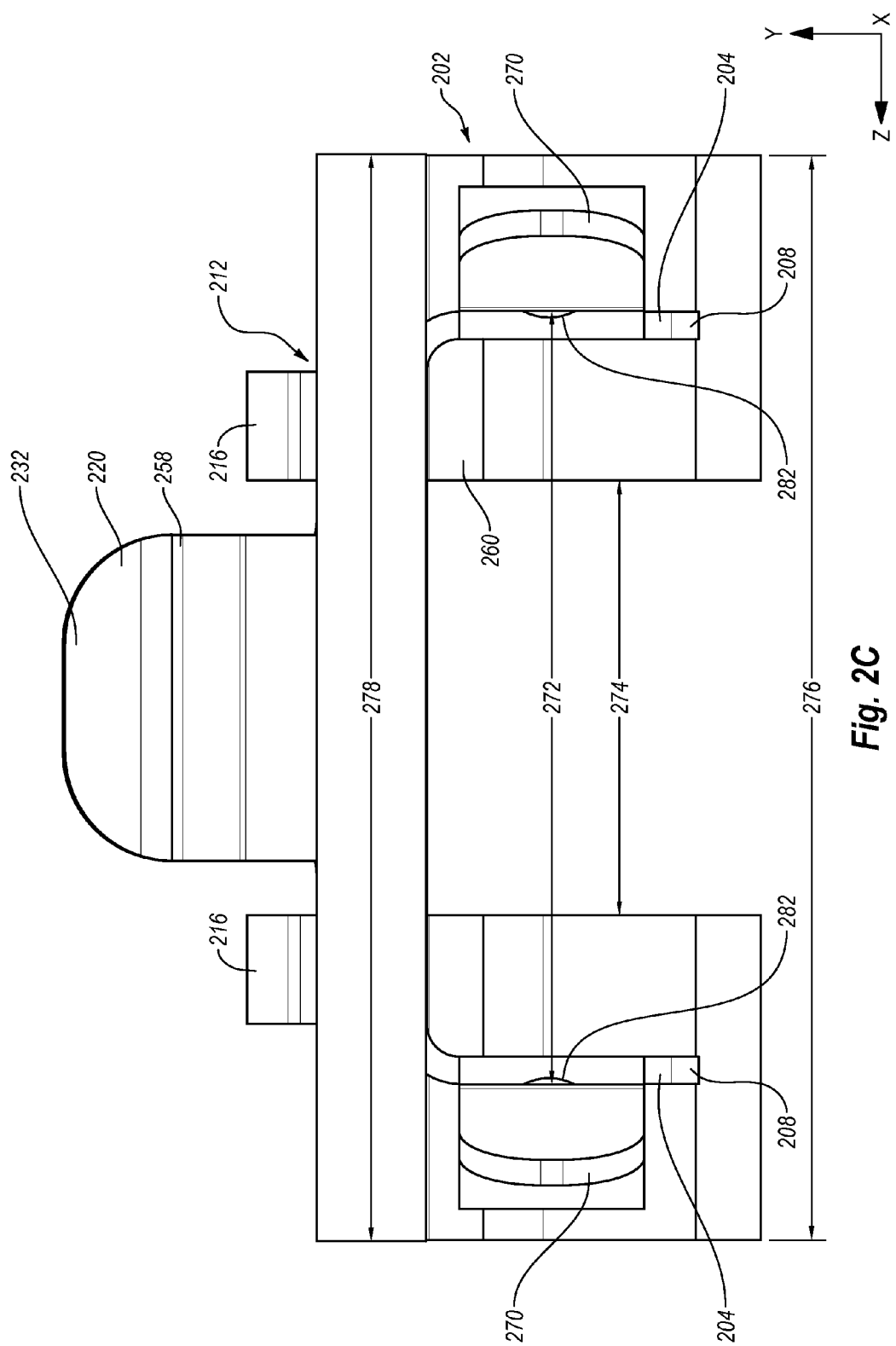

FIGS. 2A-2C illustrate an example embodiment of the clip 200. The clip 200 may be implemented as the clip 200 in the optoelectronic module 100 of FIGS. 1A-1D. FIG. 2A depicts a perspective view of the clip 200. FIG. 2B depicts a side view of the clip 200. FIG. 2C depicts a front view of the clip 200. The clip 200 may be configured to maintain engagement between an optical interface and a lens assembly. Additionally, a user may unlatch the clip 200, which may allow disengagement of the optical interface from the lens assembly without disassembling an optoelectronic module including the optical interface and the lens assembly. For example, with combined reference to FIGS. 1A-1D and 2A-2C, the clip 200 may be configured to maintain engagement between the connector 300 and the lens assembly 400, which may be positioned within the module housing 140. A user may unlatch the clip 200 from the lens assembly 400, which may disengage the connector 300 from the lens assembly 400. The user may then withdraw the connector 300 and the clip 200 from the module housing 140.

With reference to FIGS. 2A-5B, an example embodiment of the clip 200 will be described in the context of FIGS. 1A-1D, which may include reference to the connector 300, the lens assembly 400, and the optoelectronic module 100. However, embodiments of the clip 200 may be used with other optical interfaces such as other pluggable MT connectors and/or with other optoelectronic modules.

Referring to FIGS. 2A-2C, the clip 200 may include a connector retention mechanism 202. The connector retention mechanism 202 may be configured to retain the optical interface. The connector retention mechanism 202 may generally support and maintain a position of the optical interface with respect to the clip 200.

In some embodiments, the connector retention mechanism 202 may include one or more retention arms 204. The retention arms 204 may be configured to at least partially surround at least a portion of the optical interface. In this and other embodiments, each of the retention arms 204 may include a vertical portion 208. Dimensions of the vertical portion 208 may be configured to accommodate a specific optical interface. For example, the retention arms 204 may be configured to at least partially surround the connector 300 discussed herein. Accordingly, the vertical portion 208 may be configured to substantially contact one or more side surfaces of the connector 300.

In some embodiments, the retention arms 204 may omit, integrate, or extend the vertical portions 208 and/or the vertical portions 208 may include dimensions selected such that the optical interface may be retained in the connector retention mechanism 202 by spring force or compression force. Additionally or alternatively, the retention arms 204 may include a horizontal portion that may be configured to extend at least partially between the retention arms 204. The horizontal portion may be configured to support or be positioned adjacent to a portion of a bottom surface of the connector 300.

The connector retention mechanism 202 may include a rear interface support 212. The rear interface support 212 may be configured to support an optical interface retained therein. Additionally, in some embodiments, the connector retention mechanism 202 may be configured to apply a first retention force 244A and/or a second retention force 244B (FIGS. 2A and 2B only) (generally, retention force 244 or retention forces 244) to the optical interface.

In the clip 200, the rear interface support 212 may include one or more retention spring arms 260. The retention spring arms 260 may be configured to apply one or more of the retention forces 244 to the optical interface in some circumstances. For example, in some configurations, the retention spring arms 260 may be configured to apply the retention forces 244 when an optical interface is retained in the connector retention mechanism 202. Additionally or alternatively, the optical interface may apply a force to the rear interface support 212. The force applied by the optical interface may include a direction in substantially the negative x-direction. The retention spring arms 260 may be configured to elastically flex, which may result in the retention force 244 counteracting the force applied by the optical interface. In these and other circumstances, the retention forces 244 may maintain the optical interface in a forward (e.g., having a larger x-coordinate) position with respect to the clip 200, which may position to enable engagement with a lens assembly.

Additionally, in some embodiments one or more of the retention forces 244 may allow the optical interface to be "snap fit" into the connector retention mechanism 202. For example, the retention spring arms 260 may be configured to apply the retention forces 244 having an adequate magnitude to retain the optical interface.

The retention spring arms 260 may include arced sections 262, horizontal sections 268, and vertical sections 264. The arced sections 262 may include portions of the retention spring arms 260 that are configured to elastically flex in response to application of a force in the negative x-direction. The vertical sections 264 and the horizontal sections 268 may include portions of the retention spring arms 260 that are configured to contact the optical interface retained in the connector retention mechanism 202. In circumstances in which the retention forces 244 are non-zero, the vertical sections 264 and the horizontal sections 268 of the retention spring arms 260 may transfer one or both of the retention forces 244 to the optical interface.

For example, with specific reference to FIG. 2B, the retention spring arms 260 may extend from a clip body 226 (FIGS. 2A and 2B only). The arced section 262 may be arced in the negative x-direction. When a force is applied against the vertical section 264 in the negative x-direction, the arced section 262 may be flexed. In response, the first retention force 244A may result in the positive x-direction.

With reference to FIG. 2B, in some embodiments, the rear interface support 212 may define a connector height 266. The connector height 266 may be defined between the horizontal sections 268 and an upper support section 254 (FIGS. 2A and 2B only). The connector height 266 may be sized to support a particular optical connector. Additionally, the connector height 266 may be sized such that introduction of the optical connector into the rear interface support 212 results in the second retention force 244B, which may at least partially retain the optical connector.

One or more dimensions of the rear interface support 212 may be configured to passively support an optical interface. In these and other embodiments, the retention forces 244 may be substantially zero unless a force is applied to the rear interface support 212 and/or an optical interface is retained therein. When the force is applied or the optical interface retained in the rear interface support 212, a magnitude of one or more of the retention forces 244 may become non-zero. Alternately or additionally, the retention forces 244 may vary in magnitude depending on a magnitude of a force in the opposite direction applied to the optical interface retained in the clip 200. Thus, the rear interface support 212 may function as a stop to prevent motion of the optical interface in the negative x-direction beyond the rear interface support 212.

The upper support section 254 (mentioned above) may extend from the clip body 226 and may separate into the retention spring arms 260. The clip body 226 may be connected to a forward section 242 of the clip 200 at clip shoulders 216. The clip shoulders 216 may include arcs of material between the clip body 226 and the forward section 242. The arcs of material may allow for some deflection and/or flexure. The clip shoulders 216 may be configured such that the clip body 226 and the connector retention mechanism 202 may rotate substantially independent of the forward section 242 of the clip 200. For example, when the clip 200 is actuated (discussed below), the connector retention mechanism 202 may not rotate about a z-axis as much as the forward section 242 or at all.

For example, with combined reference to FIGS. 1B and 2B, when the connector 300 is received in the lens assembly 400, the connector and the connector retention mechanism 202 may be constrained. Thus, in these and other circumstances, the lens assembly 400 may substantially prevent rotation of the connector retention mechanism 202.

Referring back to FIGS. 2A-2C, the clip 200 may also include the release lever 220 and a lens latch 228. The lens latch 228 may be configured to maintain the lens assembly engaged with the optical interface. The lens latch 228 may be positioned at a first end 230 of the forward section 242. In this and other embodiments, the lens latch 228 may also include a rounded portion 240. The rounded portion 240 may be configured to reduce interference as the optical interface retained in the connector retention mechanism 202 is introduced into the lens assembly.

The release lever 220 may be configured to unlatch the lens latch 228, which may allow the optical interface to disengage from the lens assembly. The release lever 220 may be connected to the forward section 242 at a second end 252 of the release lever 220. In some embodiments, the connection to the forward section 242 may be substantially rigid. As used with reference to the connection of the release lever 220 to the forward section 242, the term "substantially rigid" may indicate that a force applied to a first end 232 (FIGS. 2A and 2B only) of the release lever 220 may be transferred to the forward section 242 via the connection. For instance, rather than only the release lever 220 moving in response to the force (e.g., 236 discussed below) on the first end 232, the forward section 242 may also move.

With specific reference to FIG. 2B, in this and other embodiments, a latching force 234 may act on the lens assembly in some circumstances. For example, in some embodiments, the clip 200 may be configured such that the latching force 234 may have a non-zero magnitude. For example, the clip 200 may include the clip shoulders 216, which may include the arcs of material between the clip body 226 and the forward section 242. The arcs of material may result in the latching force 234 having a non-zero magnitude when the clip 200 is retaining an optical interface that is received in a lens assembly. Moreover, in these and other embodiments, one or more dimensions of the clip 200 may be configured such that when the optical interface is received within the lens assembly, the clip 200 may be stretched, which may result in the latching force 234.

In some embodiments, one or more dimensions of the clip 200 may be configured such that a magnitude of the latching force 234 may be substantially zero unless a force is applied to the clip 200 or another component that attempts to remove the optical interface from the lens assembly. In these embodiments, when the force is applied, the magnitude of the latching force 234 may become non-zero. The latching force 234 is described below in circumstances in which the latching force 234 is non-zero.

When the latching force 234 has a non-zero magnitude, the lens assembly may press against the optical interface retained in the connector retention mechanism 202. Accordingly, the lens latch 228 may function as a stop to prevent motion of the lens assembly in the positive x-direction beyond the lens latch 228. The latching force 234 combined with the retention force 244 may maintain the lens assembly and the optical interface in an engaged configuration.

To activate the release lever 220, which may unlatch the lens latch 228 from the lens assembly, the actuation force 236 may be applied to the release lever 220. The actuation force 236 may result in the first end 232 of the release lever 220 being displaced in the negative y-direction. As a result, the second end 252 of the release lever 220, and thus the lens latch 228, may be displaced in the positive y-direction, in a manner described in more detail to follow. Displacement of the lens latch 228 in the positive y-direction is represented in FIG. 2B by arrow 238. Specifically, in the depicted clip 200, the forward section 242 of the clip 200 including the lens latch 228 may be displaced in the positive y-direction so as to disengage the lens latch 228 from the lens assembly.

For example, the forward section 242 of the clip 200 may rotate clockwise (according to the orientation of FIG. 2B) about the clip shoulders 216. When the lens latch 228 is displaced a predefined distance (e.g., a height of the lens latch 228) in the positive y-direction, the latching force 234 may no longer act on the lens assembly and/or the lens latch 228 is displaced sufficiently to no longer interfere with the lens assembly. When the latching force 234 no longer acts on the lens assembly and/or the lens latch 228 is displaced sufficiently to no longer interfere with the lens assembly, the clip 200 and the optical interface retained in the connector retention mechanism 202 may be disengaged from the lens assembly.

In some embodiments, the release lever 220 may include a preload force 256. The preload force 256 may generally return the release lever 220 to an angular position with respect to the clip body 226, such as the angular position illustrated in FIG. 2B. For example, after the actuation force 236 is removed from the release lever 220, the preload force 256 may return the release lever 220 to the angular position with respect to the clip body 226 illustrated in FIG. 2B. The preload force 256 may vary in magnitude. For instance, the preload force 256 may have substantially zero magnitude when the clip 200 is out in the open (e.g., as shown in FIGS. 1C and 1D). Additionally, the preload force 256 may have some non-zero magnitude when the release lever 220 is displaced downward after insertion into an optoelectronic module.

Referring to FIGS. 2A-2C, the release lever 220 may also include a secondary latch 258. The secondary latch 258 may be configured to engage a secondary latch opening defined in a module housing. For example, with combined reference to FIGS. 1B and 2A-2C, a secondary latch opening 120 may be defined in the module housing 140. The secondary latch 258 may be configured to engage the secondary latch opening 120 when the clip 200 is positioned within the module housing 140. When the actuation force 236 is applied to the release lever 220, a resulting displacement in the negative y-direction of the first end 232 of the release lever 220 may disengage the secondary latch 258 from the latch opening 120 defined in the module housing 140 and may displace the forward section 242 in the positive y-direction as already described. When the lens latch 228 is displaced a predefined distance in the positive y-direction and the secondary latch 258 is disengaged from the latch opening 120, the connector 300 may be disengaged from the lens assembly 400 and may be withdrawn from the module housing 140.

Additionally, with combined reference to FIGS. 1B and 2B, the dimensions of the clip 200 may be determined in relation to the module housing 140. For example, the release lever 220 may be sized to protrude from the module housing 140, Specifically, the release lever 220 may include a length 250 defined between the second end 252 of the release lever 220 and the first end 232 of the release lever 220. The length 250 may be determined such that a portion of the release lever 220 protrudes from the module housing 140. In some embodiments, the release lever 220 may be fitted with a handle.

Referring back to FIGS. 2A-2C, in some embodiments, the clip 200 may include lens-stabilizing arms 270. The lens-stabilizing arms 270 may extend in substantially the positive x-direction. The lens-stabilizing arms 270 may be configured to contact sides of a lens assembly to reduce motion in the positive and negative z-directions. More generally, the lens-stabilizing arms 270 may confine the lens assembly in the z-direction between the lens-stabilizing arms 270.

Referring to FIG. 2C, the clip 200 may be configured to correspond to a particular optical interface and/or a particular lens assembly. For example, the retention spring arms 260 may be separated by a first distance 274. The first distance 274 may correspond to a width of a particular MT connector, for instance. The first distance 274 may allow the particular connector to be positioned between the retention spring arms 260 and/or such that the retention spring arms 260 contact or have a specified clearance from one or more surfaces of the particular optical interface.

Additionally, the clip 200 may be configured to correspond to a particular lens assembly. For example, the lens-stabilizing arms 270 and/or dimples 282 included thereon, may be separated by a second length 272. The second length 272 may be determined such that the lens-stabilizing arms 270 contact one or more surfaces of the particular lens assembly, or at least such that the lens-stabilizing arms 270 confine the lens assembly therebetween in the z-direction. In some embodiments including the dimples 282, the second length 272 may be determined the such that the dimples 282 may be received in a cavity or recess on the particular lens assembly. When received in the cavity or recess on the particular lens assembly, the dimples 282 may contribute a force that may act in the z-direction and/or the x-direction to maintain engagement between an optical interface and the particular lens assembly.

With continued reference to FIG. 2C, the lens latch 228 may have a lens latch length 278. The lens latch length 278 may be greater than the second length 272 and/or greater than a width of the lens assembly. The lens latch length 278 may reduce collisions between the lens latch 228 and a lens assembly opening configured to receive the optical interface.

Additionally, the rear interface support 212 may include a rear support length 276. The rear support length 276 may provide a structure to which a dust seal such as the dust seal 122 of FIGS. 1A-1D may attach. Some additional details of the structure to which the dust seal attaches are provided below with reference to FIGS. 5A and 5B.

Figure 3A:
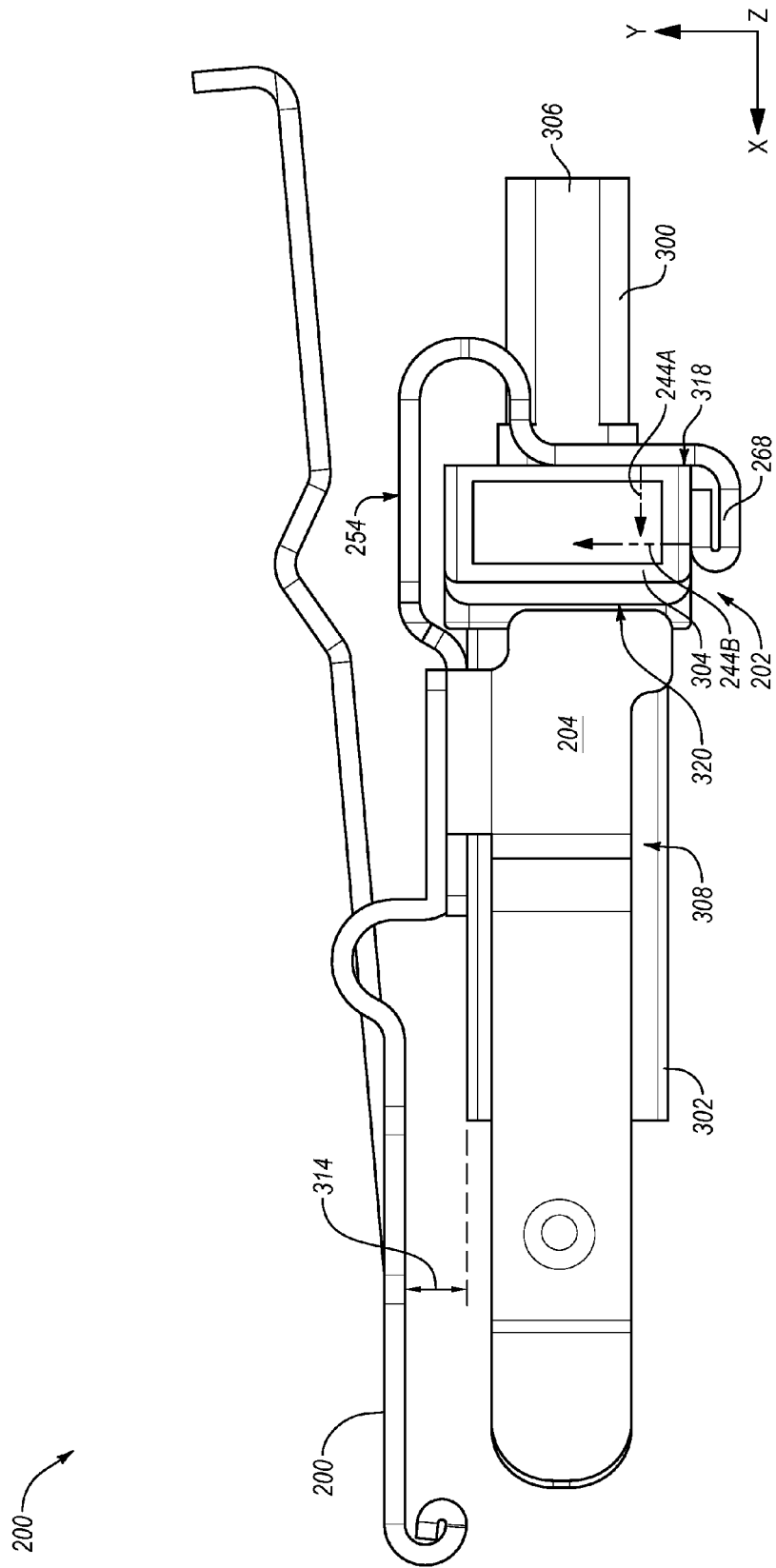
FIGS. 3A and 3B illustrate the clip of FIGS. 2A-2C retaining an example connector.
Figure 3B:
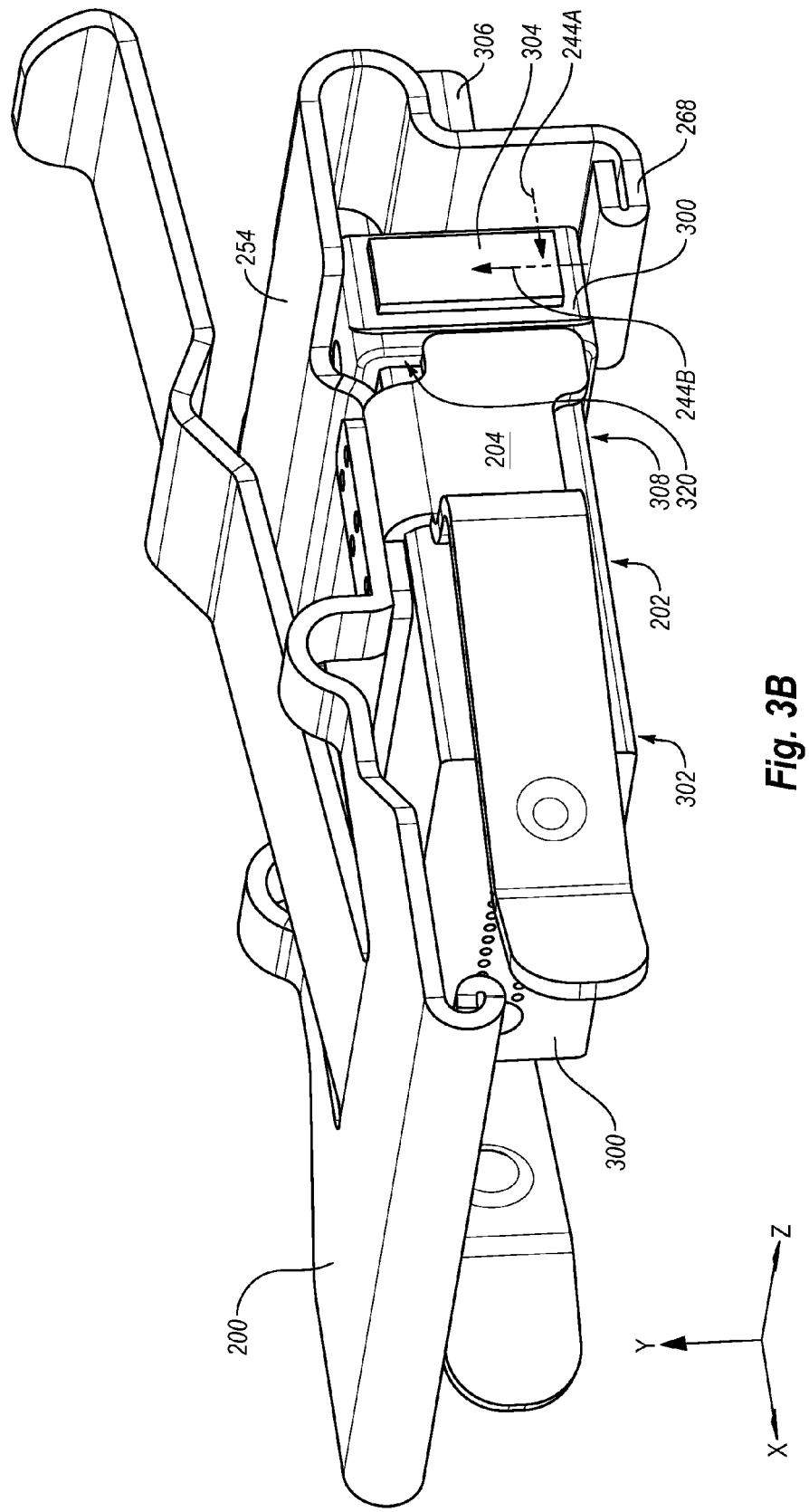

FIGS. 3A and 3B illustrate the clip 200 of FIGS. 2A-2C retaining an example of the connector 300 discussed with reference to FIGS. 1A-1D. The connector 300 is one example of an optical interface as that term is used herein. The connector 300 in the depicted embodiment is a pluggable MT connector. In some embodiments, the clip 200 may be configured to retain other types of optical interfaces. FIG. 3A depicts a side view of the clip 200 retaining the connector 300 and FIG. 3B depicts a perspective view of the clip 200 retaining the connector 300.

As mentioned above, the clip 200 may be configured to retain the connector 300 and to maintain the connector 300 in a forward position (e.g., having a greater x-dimension) with respect to the clip 200. In the forward position, an insertable portion 302 of the connector 300 may be forward of the retention arms 204. The insertable portion 302 may include the portion of the connector 300 that is configured to be received, introduced into, or positioned with respect to a lens assembly (not shown in FIGS. 3A and 3B).

Additionally, the connector 300 may also include a supported portion 308 (FIG. 3B only). The supported portion 308 may include the portion of the connector 300 that may be contacted by the retention arms 204 or more generally may include the portion of the connector 300 substantially enclosed, enveloped, or surrounded by the retention arms 204. In this and other embodiments, the retention arms 204 may contact and/or be positioned adjacent to the supported portion 308 along portions of two sides of the connector 300. In some embodiments, the retention arms 204 may contact and/or be positioned adjacent to one or more entire sides of the supported portion 308, an entire bottom of the connector 300, the retention arms 204 may not contact one or more of the sides or the bottom, etc.

The connector 300 may also include a rear portion 304. When retained in the connector retention mechanism 202, the rear portion 304 may be positioned in the rear interface support 212. As best depicted in FIG. 3B, in this and other embodiments, the rear portion 304 may extend past (e.g., has higher and/or lower z-coordinate) the retention arms 204. The retention spring arms 260 may apply the first retention force 244A to a rear surface 318 of the rear portion 304, which may press a front surface 320 of the rear portion 304 against the retention arms 204. By pressing the front surface 320 of the rear portion 304 against the retention arms 204, the insertable portion 302 may be maintained forward of the retention arms 204 and the connector 300 may be retained in the connector retention mechanism 202.

The connector retention mechanism 202 may also secure the connector 300 in the y-direction. Specifically, the rear portion 304 may be supported by and/or held between the upper support section 254 and the horizontal sections 268. Additionally or alternatively, the supported portion 308 may be supported by and/or held between the horizontal sections 268 of the retention arms 204 and the clip body 226. Movement of the connector 300 with respect to the clip 200 may accordingly be limited. In some embodiments, by securing the connector 300, a vertical clearance 314 (FIG. 3A only). The vertical clearance 314 may enable reception of the insertable portion 302 into a lens assembly without the first clip 200A physically interfering.

The connector 300 may also include a cable support portion 306. The cable support portion 306 generally includes a portion of the connector 300 that supports one or more optical cables (e.g., the optical cables 102 of FIGS. 1A-1D). For example, one or more optical cables may be received into or otherwise coupled to the cable support portion 306. With combined reference to FIGS. 2C and 3B, the first distance 274 may be sized to accommodate the cable support portion 306 of the connector 300.

Figure 4A:
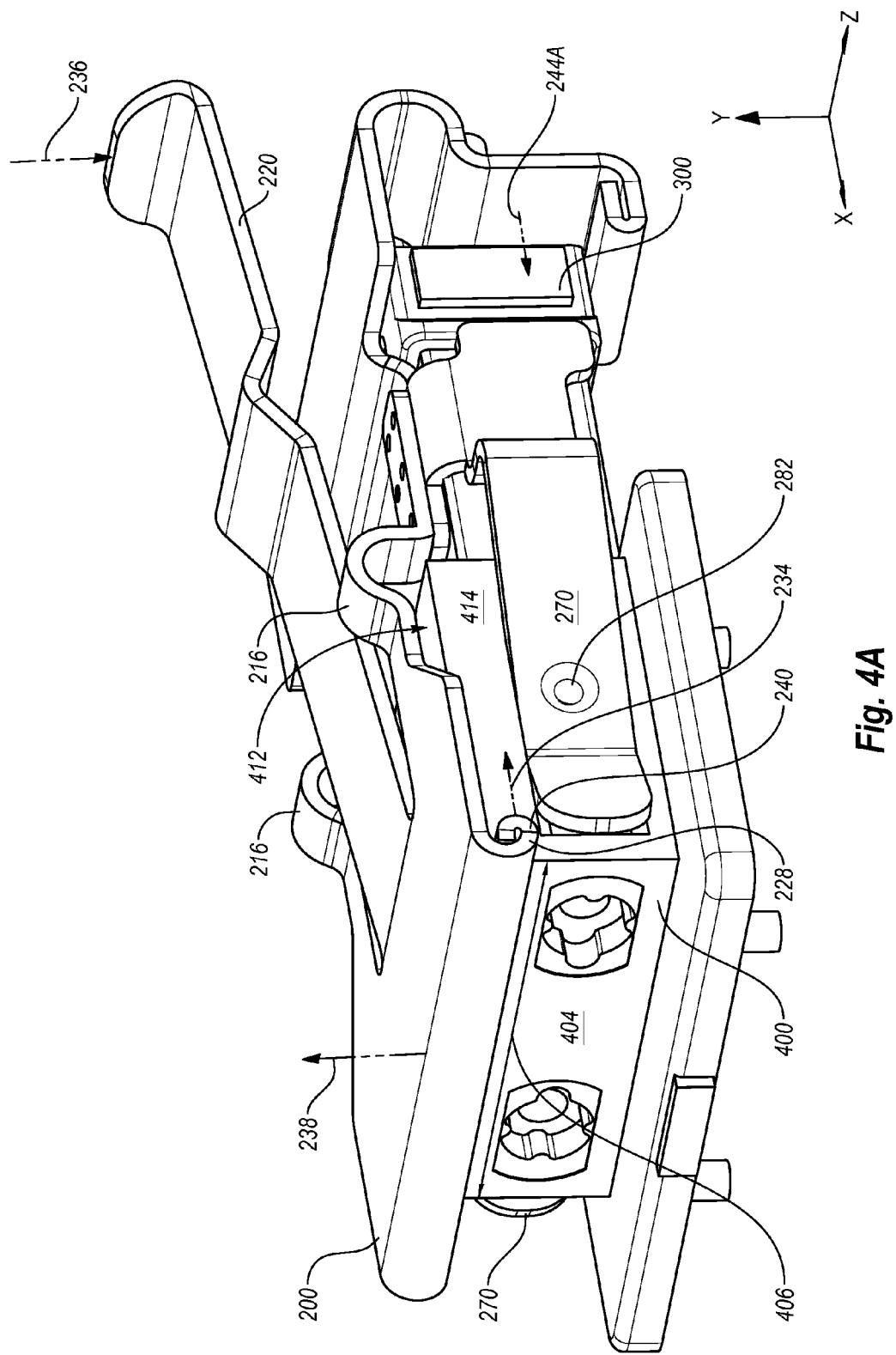
FIGS. 4A and 4B illustrate the clip retaining the connector engaged with an example lens assembly.
Figure 4B:
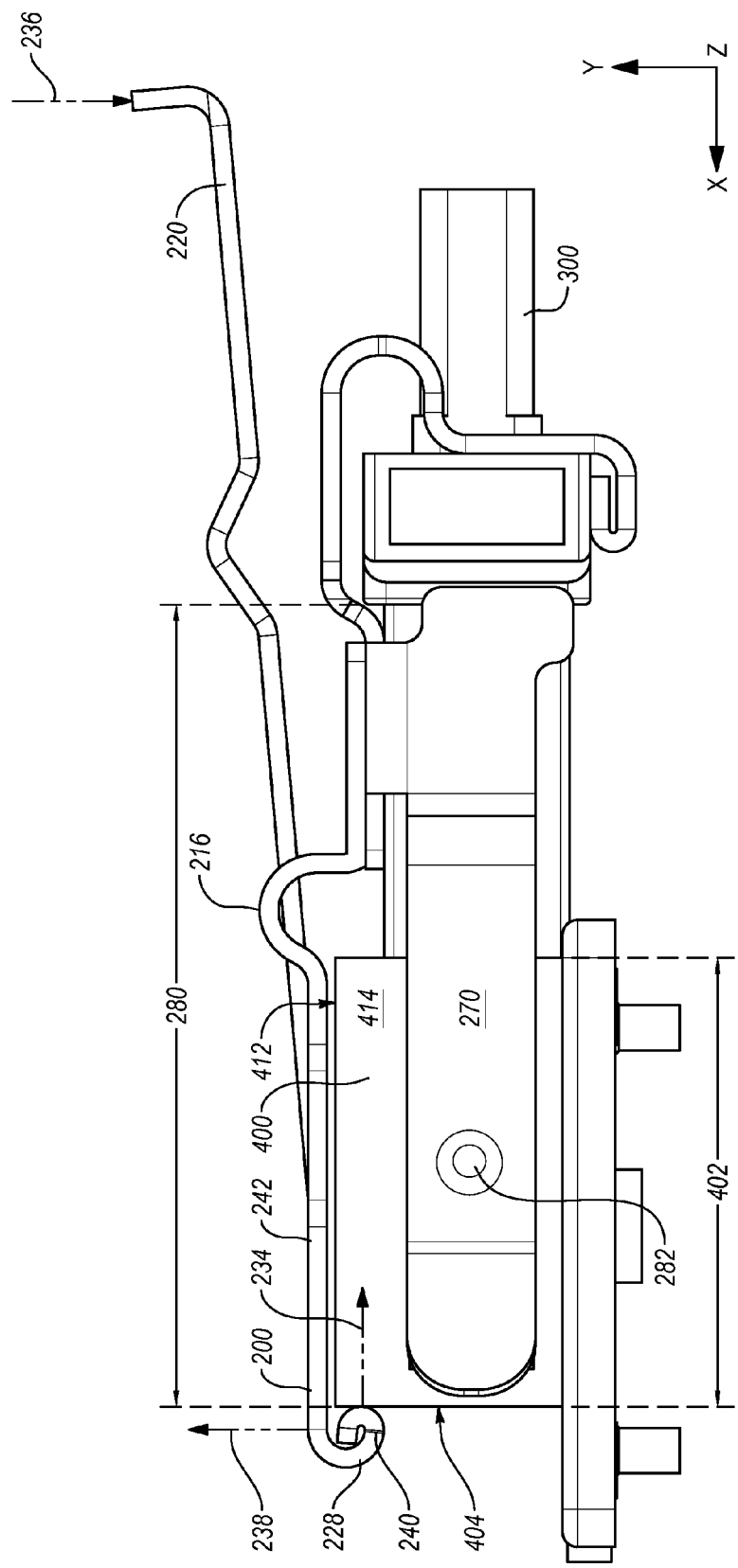

FIGS. 4A and 4B illustrate the clip 200 of FIGS. 2A-2C retaining the connector 300 engaged with an example of the lens assembly 400. The clip 200 may be configured to maintain the connector 300 engaged with the lens assembly 400 and to maintain an alignment between the connector 300 and the lens assembly 400. Additionally, the clip 200 may be configured to be unlatched through application of the actuation force 236, enabling disengagement of the connector 300 from the lens assembly 400. FIG. 4A depicts a perspective view of the clip 200 retaining the connector 300 engaged with the lens assembly 400 and FIG. 4B depicts a side view of the clip 200 retaining the connector 300 engaged with the lens assembly 400.

The lens latch 228 may be configured to apply the latching force 234 against a front surface 404 of the lens assembly 400. More generally, the lens latch 228 may be configured to engage the front surface 404 of the lens assembly 400 and thereby prevent movement of the clip 200 and the connector 300 in the negative x-direction relative to the lens assembly 400. The latching force 234 may be oriented in substantially the negative x-direction while the first retention force 244A may be oriented in substantially the positive x-direction. The first retention force 244A and/or the latching force 234 may thus maintain engagement between the connector 300 and the lens assembly 400.

In this and other embodiments, the lens latch 228 may be configured to apply the latching force 234 along a length 406 of the front surface 404. Accordingly, the latching force 234 may be transferred about evenly along the length 406. Thus, the lens latch 228 may also maintain an alignment between the lens assembly 400 and the connector 300.

When the release lever 220 is activated by the actuation force 236, the connector retention mechanism 202 may be held relatively fixed. The forward section 242 may rotate clockwise about the clip shoulders 216, which may displace the lens latch 228 in substantially the positive y-direction such that the latching force 234 disengages from the front surface 404. The displacement substantially in the positive y-direction of the lens latch 228 is represented in FIGS. 4A and 4B by the arrow 238. The connector 300 may then be disengaged from the lens assembly 400 by moving the connector 300 and the clip 200 in substantially the negative x-direction.

With reference to FIG. 4B, the clip 200 may be configured to produce a secure engagement between the lens assembly 400 and the connector 300. For example, the lens assembly 400 may have a lens depth 402. The clip 200 may accordingly include a length 280 that enables the connector 300 to be engaged with the lens assembly 400 with the lens latch 228 applying the latching force 234 against the front surface 404.

Referring back to FIGS. 4A and 4B, when the connector 300 is engaged with the lens assembly 400, the lens-stabilizing arms 270 may contact side surfaces 414 of the lens assembly 400, or more confine the lens assembly 400 therebetween. Only one of the side surfaces 414 and only one of the lens-stabilizing arms 270 is visible in FIGS. 4A and 4B. Contact between the lens-stabilizing arms 270 and the side surfaces 414 may reduce motion of the lens assembly 400 with respect to the connector 300 in substantially the z-direction.

Additionally, in the embodiment depicted in FIGS. 4A and 4B, dimples 282 may be configured to be received in cavities or recesses included on the lens assembly 414. When the dimples 282 are received in the cavities or recesses, a force that may help maintain engagement between the connector 300 and the lens assembly 400 may be created.

In these and other embodiments, unlatching of the lens assembly 400 may be prevented unless the actuation force 236 includes a force having a magnitude of a particular threshold. The particular threshold may be determined at least in part by material selection (e.g., rigidity, flexibility, etc.) of the clip 200, dimensions of the clip shoulder (216 in FIGS. 2A-2C) and the like.

Additionally, in this and other embodiments, the lens latch 228 may include the rounded portion 240. The rounded portion 240 may reduce interference when the connector 300 retained in the connector retention mechanism 202 is introduced into the lens assembly 400. Specifically, as the connector 300 is moved in the positive x-direction, the rounded portion 240 may slide along the top surface 412 of the lens assembly 400. When the connector 300 is moved such that the lens latch 228 is forward (e.g., having a greater positive x-coordinate) of the front surface 404, the lens latch 228 may move or spring in the negative y-direction, which may latch the lens assembly 400 to the connector 300.

Figure 5A:
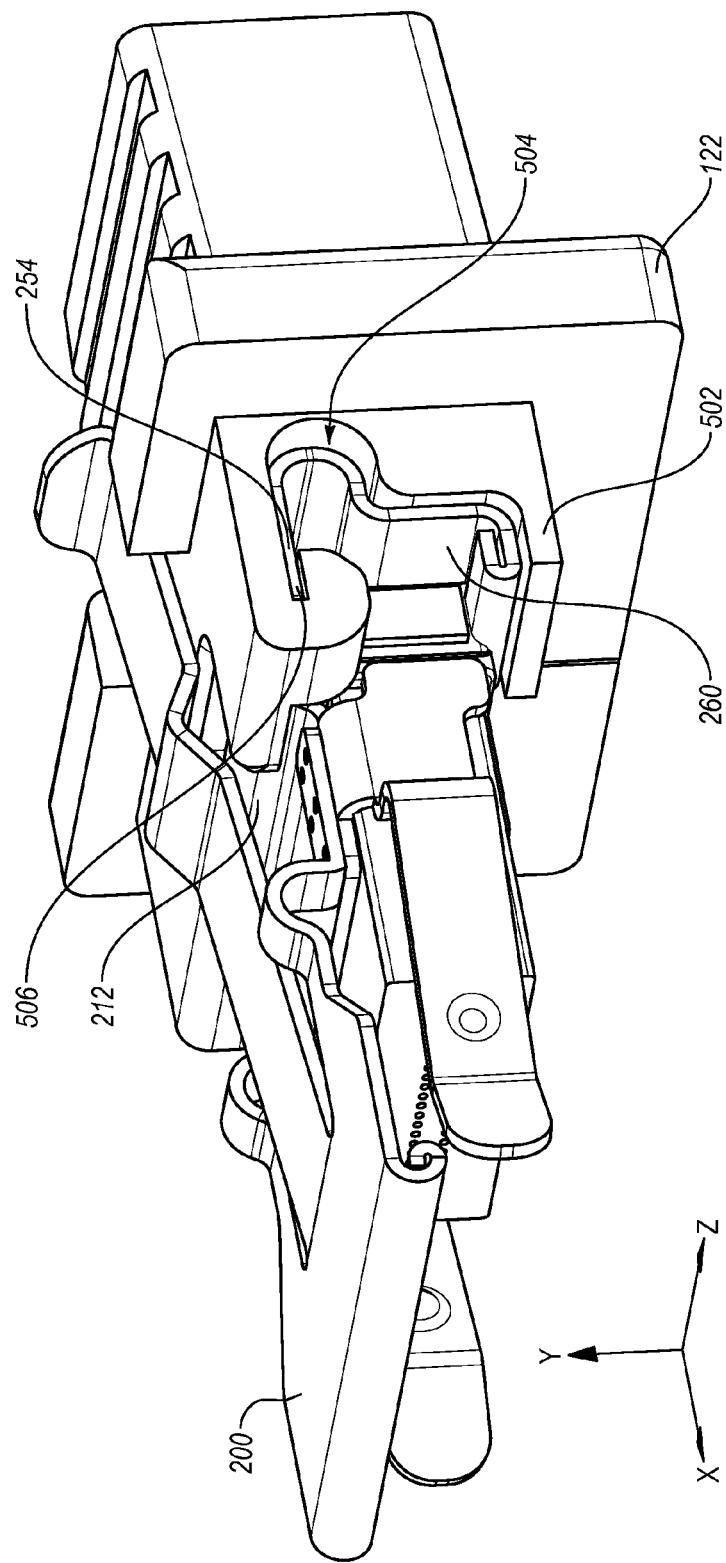
FIGS. 5A and 5B illustrate the clip with an example dust seal.
Figure 5B:
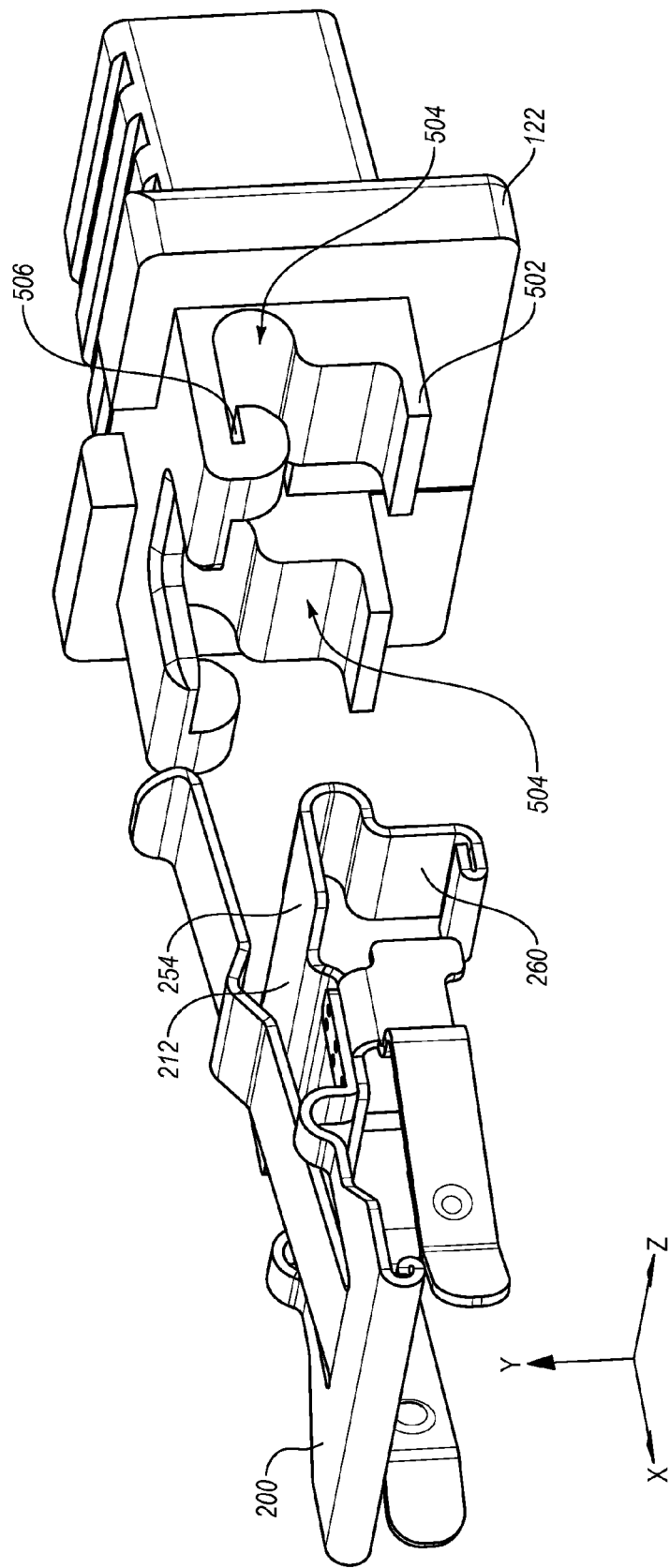

FIGS. 5A and 5B illustrate the clip 200 with an example embodiment of the dust seal 122. FIG. 5A depicts the clip 200 attached to the dust seal 122 and FIG. 5B depicts the clip 200 exploded from the dust seal 122. The dust seal 122 in FIGS. 5A and 5B includes an attachment structure 502. The attachment structure 502 may be configured to attach the clip 200 to the dust seal 122. The attachment structure 502 may define cutaway portions 504. The cutaway portions 504 may correspond to the rear interface support 212. In particular, the cutaway portion 504 may include a shape that is similar to the retention spring arms 260.

Additionally, the cutaway portions 504 may include attachment slots 506. The attachment slots 506 may be configured to receive a portion of the upper support section 254. With combined reference to FIGS. 2C, 5A, and 5B, the rear support length 276 may be sized such that the upper support section 254 includes material that may be received by the attachment slots 506.

Figure 6A:
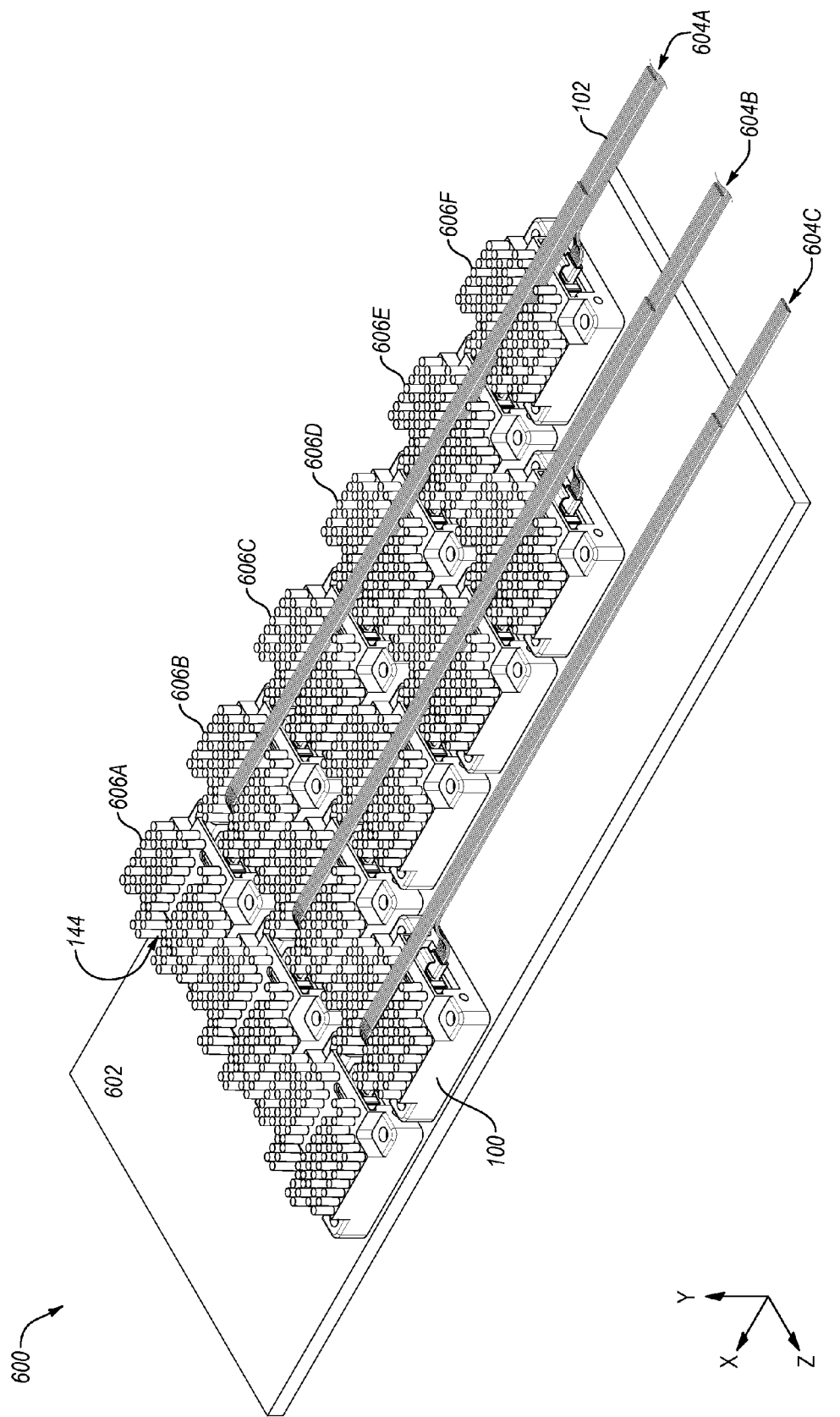
FIGS. 6A and 6B illustrate an example multiple module implementation.
Figure 6B:
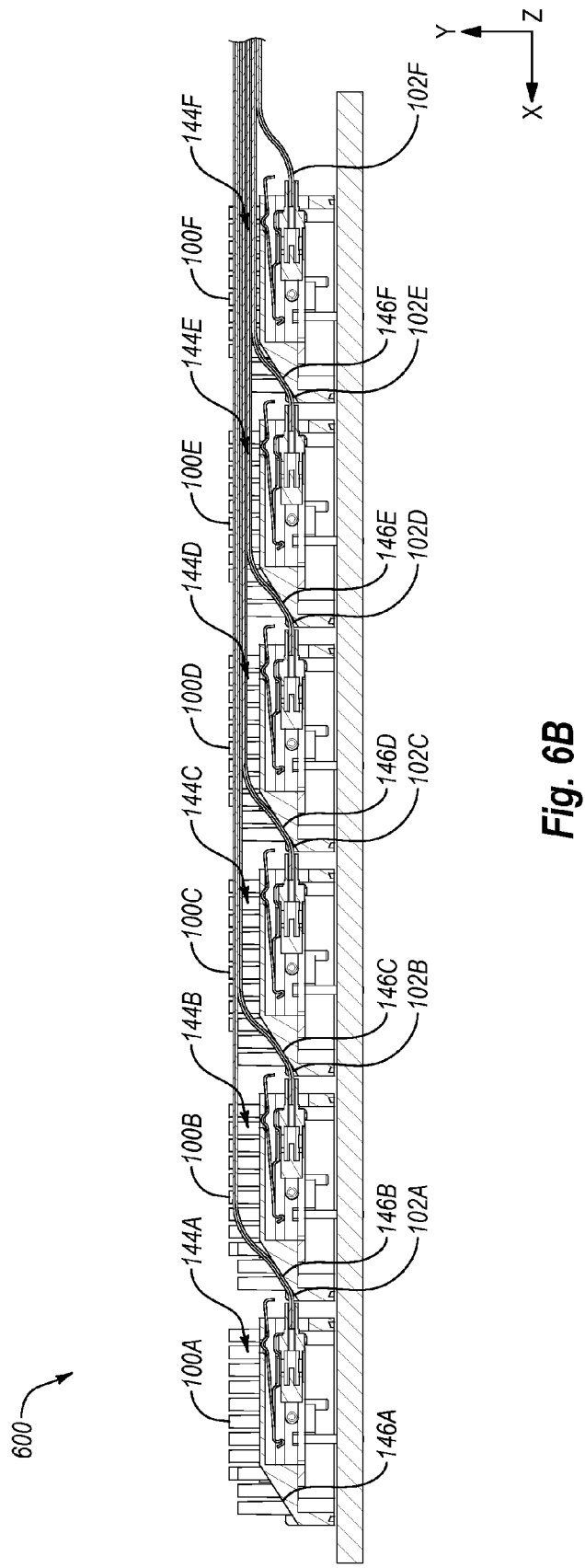

FIGS. 6A and 6B illustrate an example multiple module implementation 600. FIG. 6A depicts a perspective view of the multiple module implementation 600 and FIG. 6B depicts a side, sectional view of a portion of the multiple module implementation 600. The multiple module implementation 600 includes multiple examples of the optoelectronic module 100 of FIGS. 1A-1D, which may be mounted to a common board 602.

Referring to FIG. 6A, the multiple module implementation 600 generally depicts an example cable management system that may be implemented in environments in which multiple optoelectronic modules 100 (one of which is labeled in FIG. 6A) are utilized in close proximity to one another. The optoelectronic modules 100 may be arranged in rows 604A-604C (generally, row 604 or rows 604) and columns 606A-606F (generally, column 606 or columns 606). In FIGS. 6A and 6B, the terms "upstream" and "downstream" are meant to indicate relationships between the optoelectronic modules 100 and their positions in the columns 606 and the rows 604. Specifically, the optoelectronic module 100 in a first column 606A of a first row 604A is referred to as being upstream of another optoelectronic module 100 in a second column 606B of the first row 604A. Likewise, the optoelectronic module 100 in the second column 606B of the first row 604A is downstream of the optoelectronic module 100 in the first column 606A of the first row 604A.

The optoelectronic modules 100 in each row 604 may be oriented similarly. For example, in each of the rows 604, the optoelectronic modules 100 may be oriented such that the optical cables 102 (only one of which is labeled in FIG. 6A) extend from the optoelectronic modules 100 on a same side. For example, in FIG. 6A, two sides of the optoelectronic modules 100 may be defined as substantially parallel to the yz-plane and two sides of the optoelectronic modules 100 may be defined as substantially parallel to the xy-plane. The optoelectronic modules 100 may be oriented such that the optical cables 102 exit from a first side oriented substantially parallel to the yz-plane and having a lower x-coordinate that a second side oriented substantially parallel to the yz-plane.

With this orientation, the optical cable 102 exiting each of the optoelectronic modules 100 faces the sloped sections 146 (only one of which is labeled in FIG. 6A) of the adjacent, downstream optoelectronic module 100. Additionally, the cable paths 144 (only one of which is labeled in FIG. 6A) of each of the optoelectronic modules 100 in each of the rows 604 may be substantially aligned.

To manage the optical cables 102, each of the optical cables 102 may be positioned within the cable paths 144 of each downstream optoelectronic module 100. Additionally or alternatively, the optical cables 102 may be stacked in the cable paths 144. For example, in some embodiments one or more of the upstream optical cables 102 may be stacked on top of the optical cables 102 of one or more of the downstream optoelectronic modules 100.

For example, FIG. 6B depicts the first row 604A of FIG. 6A. In FIG. 6B, the optoelectronic modules 100 are individually labeled as optoelectronic modules 100A-100F. A first optoelectronic module 100A is upstream of a second optoelectronic module 100B, which is upstream of a third optoelectronic module 100C, etc. Each of the optoelectronic modules 100A-100F may include cable paths 144A-144F and sloped sections 146A-146F. Additionally, optical cables 102A-102F (generally, optical cable 102 or optical cables 102) exit each of the optoelectronic modules 100A-100F.

A first optical cable 102A may exit the first optoelectronic module 100A. The first optical cable 102A may then contact a portion of a second sloped section 146B of the second optoelectronic module 100B. The first optical cable 102A may be positioned in a second cable path 144B of the second optoelectronic module 100B. The second sloped section 146B may be configured (e.g., include the angle 150 of FIG. 1B) such that a bend imparted to the first optical cable 102A does not exceed a maximum acceptable bend radius.

A second optical cable 102B may exit the second optoelectronic module 100B. The second optical cable 102B may then contact a portion of a third sloped section 146C of the third optoelectronic module 100C. The first optical cable 102A and the second optical cable 102B may be positioned in a third cable path 144C of the third optoelectronic module 100C. The first optical cable 102A may be stacked on top of the second optical cable 102B in the third cable path 144C. The third sloped section 146C may be configured (e.g., including the angle 150 of FIG. 1B) such that a bend imparted to the second optical cable 102B does not exceed a maximum acceptable bend radius. Similarly, a third optical cable 102C, a fourth optical cable 102D, and a fifth optical cable 102E may be positioned in the cable paths 144D-144F along with the first optical cable 102A and the second optical cable 102B. Additionally, each of the optical cables 102A-102E may be supported by sloped sections 146D-146F immediately downstream the optoelectronic modules 100D-100F. Additionally, once positioned in the cable paths 144, movement of the optical cables 102 may be limited in the z-direction.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cable clip configured to maintain engagement of an optical interface with a lens assembly included in an optoelectronic module, the cable clip comprising:
   a clip shoulder;
   a clip body;
   a forward section that is attached to the clip body at the clip shoulder and that includes a first end opposite the clip shoulder, the forward section extending substantially in a first direction from the clip body such that the forward section extends along at least a portion of a top, external surface of the lens assembly when a portion of optical interface is received in the lens assembly;
   a connector retention mechanism that is configured to retain the optical interface, wherein the connector retention mechanism extends from the clip body;
   a lens latch positioned at the first end, wherein the lens latch is configured to apply a latching force to a front, external surface of the lens assembly to latch the lens assembly against the optical interface when the portion of the optical interface is received within the lens assembly; and
   a release lever that is connected to the forward section, wherein the release lever is configured to unlatch the lens latch from the lens assembly in response to application of an actuation force in a second direction that flexes the forward section relative to the connector retention mechanism and displaces the lens latch relative to the lens assembly in a third direction, which is substantially opposite the second direction.

2. The cable clip of claim 1, wherein the connector retention mechanism includes:
   a retention arm that is configured to at least partially surround the optical interface; and
   a rear interface support that is configured to support the optical interface.

3. The cable clip of claim 1, wherein the release lever includes a secondary latch configured to engage a secondary latch opening defined in a module housing of the optoelectronic module.

4. The cable clip of claim 3, wherein the secondary latch is configured to disengage from the secondary latch opening in response to the application of the actuation force.

5. The cable clip of claim 1, wherein the release lever includes a length defined such that a portion of the release lever protrudes from a module housing of the optoelectronic module.

6. The cable clip of claim 1, wherein the connector retention mechanism includes a rear interface support, wherein the rear interface support is configured to apply a retention force on the optical interface retained in the connector retention mechanism.

7. The cable clip of claim 1, wherein the lens latch includes a rounded portion configured to reduce interference between the cable clip and the lens assembly while the optical interface is introduced into the lens assembly.

8. A connector assembly configured to be at least partially positioned within a module housing of an optoelectronic module, the connector assembly comprising:
   a cable clip that is configured to maintain engagement between an optical interface and a lens assembly when the cable clip is latched and to allow disengagement of the connector from the lens assembly when the cable clip is unlatched, wherein the cable clip includes:
      a clip shoulder;
      a clip body;
      a forward section that is attached to the clip body at the clip shoulder and that includes a first end opposite the clip shoulder, the forward section extending substantially in a first direction from the clip body such that the forward section extends along at least a portion of a top, external surface of the lens assembly when a portion of optical interface is received in the lens assembly;
      a connector retention mechanism that extends from the clip body and is configured to retain the optical interface;
      a lens latch positioned by the first end, wherein the lens latch is configured to apply a latching force to a front, external surface of the lens assembly to latch the lens assembly against the optical interface when the portion of the optical interface is received within the lens assembly;
      a release lever that is connected to the forward section and is sized in relation to the module housing such that when the optical interface is received in the lens assembly, a portion of the release lever protrudes from the module housing, wherein the release lever is configured to unlatch the cable clip in response to application of an actuation force to the portion of the release lever that protrudes from the module housing in a second direction that flexes the forward section relative to connector retention mechanism and displaces the lens latch relative to the lens assembly in a third direction, which is substantially opposite the second direction; and
   a dust seal that is configured to at least partially surround the connector and the cable clip, wherein the dust seal is sized to substantially fill a space between the connector and a module opening through which the connector assembly is introduced into the module housing.

9. The connector assembly of claim 8, wherein the cable clip includes a connector retention mechanism configured to retain the connector with respect to the cable clip.

10. The connector assembly of claim 9, wherein the connector retention mechanism includes a rear interface support configured to apply a retention force against a rear surface of the connector.

11. The connector assembly of claim 10, wherein the cable clip includes a rear interface support configured to elastically flex and apply the retention force.

12. The connector assembly of claim 8, wherein the cable clip includes a lens latch positioned at a first end of a forward section, the lens latch configured to contact a front surface of the lens assembly when the connector is received in the lens assembly.

13. The connector assembly of claim 12, wherein the release lever is configured to disengage from the lens assembly in response to application of the actuation force.

14. The connector assembly of claim 13, wherein:
the release lever includes a secondary latch that is configured to engage a secondary latch opening defined in the module housing;
the release lever is configured to disengage from the secondary latch opening in response to the actuation force; and
the cable clip includes lens-stabilizing arms that extend from the connector retention mechanism, wherein the lens-stabilizing arms are configured to confine the lens assembly therebetween.

15. The connector assembly of claim 8, wherein the dust seal includes an attachment structure that is configured to attach the cable clip to the dust seal.

16. A cable clip that is configured to maintain engagement between a mechanical transfer (MT) connector having twenty-four optical channels configured to communicate twenty-four channels of data and a lens assembly included in an optoelectronic module configured to communicate data at 25 gigabits per second (G) or higher, the cable clip comprising:
clip shoulders;
a clip body;
a connector retention mechanism configured to retain the MT connector, wherein the connector retention mechanism extends from the clip body;
a forward section attached to the clip body at the clip shoulders and that includes a first end opposite the clip shoulders, the forward section extending substantially in a first direction from the clip body such that the forward section extends along at least a portion of a top, external surface of the lens assembly when a portion of MT connector is received in the lens assembly;
a lens latch positioned at the first end of the forward section, the lens latch configured to apply a latching force to a front, external surface of the lens assembly when a portion of the MT connector is received within the lens assembly; and
a release lever that extends from the forward section and is sized to partially protrude from a module housing, wherein in response to application of an actuation force to the release lever in a second direction, the release lever is configured to flex the forward section relative to the connector retention mechanism and displace the lens latch relative to the lens assembly in a third direction, which is substantially opposite the second direction.

17. The cable clip of claim 16, wherein the connector retention mechanism includes:
retention arms configured to at least partially surround a supported portion of the MT connector and not surround an insertable portion of the MT connector;
retention spring arms configured to apply a first retention force to a rear surface of the MT connector to maintain the MT connector in a forward position with respect to the cable clip; and
an upper support section and a horizontal support sections configured to support a rear portion of the MT connector therebetween.

18. The cable clip of claim 17, further comprising lens-stabilizing arms that extend from the connector retention mechanism, wherein the lens-stabilizing arms are configured to confine the lens assembly therebetween.

19. The cable clip of claim 17, wherein the release lever includes a secondary latch that is configured to engage a secondary latch opening defined in a module housing of the optoelectronic module, wherein the secondary latch is further configured to disengage from the secondary latch opening in response to the application of the actuation force.

\* \* \* \* \*

UNITED STATES PATENT AND TRADEMARK OFFICE
CERTIFICATE OF CORRECTION

PATENT NO. : 9,134,492 B2  
APPLICATION NO. : 14/264815  
DATED : September 15, 2015  
INVENTOR(S) : Hsieh Page 1 of 1

It is certified that error appears in the above-identified patent and that said Letters Patent is hereby corrected as shown below:

In the specification

Column 13, Line 7, delete "assembly 414." and insert -- assembly 400. --, therefor.

Signed and Sealed this
Twenty-first Day of June, 2016

Michelle K. Lee
*Director of the United States Patent and Trademark Office*